US008345449B2

(12) United States Patent
Anderson et al.

(10) Patent No.: US 8,345,449 B2
(45) Date of Patent: Jan. 1, 2013

(54) CABLE-BASED MOUNTING SYSTEM

(75) Inventors: Donald Lee Anderson, Oak Park, IL (US); Vlad Gleyzer, Highland Park, IL (US)

(73) Assignee: Peerless Industries, Inc., Aurora, IL (US)

( * ) Notice: Subject to any disclaimer, the term of this patent is extended or adjusted under 35 U.S.C. 154(b) by 394 days.

(21) Appl. No.: 12/412,001

(22) Filed: Mar. 26, 2009

(65) Prior Publication Data
US 2009/0256975 A1   Oct. 15, 2009

Related U.S. Application Data

(60) Provisional application No. 61/043,667, filed on Apr. 9, 2008.

(51) Int. Cl.
*H02B 1/26* (2006.01)
*A47F 5/00* (2006.01)

(52) U.S. Cl. ......... 361/825; 248/917; 248/327; 361/827

(58) Field of Classification Search .............. 248/327 X, 248/328, 496, 917 X, 489, 495; 361/825, 361/827
See application file for complete search history.

(56) References Cited

U.S. PATENT DOCUMENTS

| | | | | |
|---|---|---|---|---|
| 1,606,289 A | * | 11/1926 | Bowers | 248/327 |
| 2,877,972 A | * | 3/1959 | Sutton et al. | 248/496 |
| 3,251,569 A | * | 5/1966 | Rynearson | 248/493 |
| 3,360,229 A | * | 12/1967 | Beyer | 248/496 |
| 3,384,987 A | * | 5/1968 | Prechtl | 40/757 |
| 3,945,599 A | * | 3/1976 | Spier et al. | 248/476 |
| 4,364,538 A | * | 12/1982 | Tomlinson | 248/495 |
| 4,775,129 A | * | 10/1988 | Gleisten | 248/493 |
| 4,932,146 A | * | 6/1990 | Long | 40/790 |
| 5,393,025 A | | 2/1995 | Franklin | |
| 5,397,090 A | * | 3/1995 | Carson et al. | 248/327 |
| 6,708,942 B2 | | 3/2004 | Barkan | |
| 6,964,399 B1 | * | 11/2005 | O'Neill | 248/292.13 |
| 7,011,283 B2 | * | 3/2006 | Lemire | 248/476 |
| 7,025,321 B2 | | 4/2006 | Jung | |
| 7,117,650 B2 | * | 10/2006 | Dockery | 52/506.07 |
| 7,891,058 B2 | * | 2/2011 | Kubli | 24/115 H |
| 2005/0087661 A1 | | 4/2005 | Rabenius | |
| 2005/0211865 A1 | | 9/2005 | Lemire | |

(Continued)

FOREIGN PATENT DOCUMENTS

DE    10 2007 014 569 A1    10/2007

(Continued)

OTHER PUBLICATIONS

Communication pursuant article 94 (3) EPC for European Patent Application No. 09 73 244.1-1252, issued Mar. 8, 2011.

*Primary Examiner* — Brian Glessner
*Assistant Examiner* — Beth Stephan
(74) *Attorney, Agent, or Firm* — Foley & Lardner LLP

(57) ABSTRACT

A mounting system for the display of an audio/visual product. A cable-based mounting system for an audio/visual product includes at least one hanging cable and at least one attachment mechanism. The at least one attachment mechanism is configured to operatively engage with a plurality of various mounting patterns located on the rear of the audio/visual product. The cable-based mounting system allows for the relatively inexpensive and uncomplicated mounting of the audio/visual product on a display region.

11 Claims, 5 Drawing Sheets

| U.S. PATENT DOCUMENTS | | | |
|---|---|---|---|
| 2005/0236543 A1 * | 10/2005 | O'Neil | 248/286.1 |
| 2006/0091274 A1 * | 5/2006 | Asamarai et al. | 248/292.11 |
| 2007/0183866 A1 * | 8/2007 | Gallien | 411/401 |
| 2007/0251893 A1 | 11/2007 | Huang | |

FOREIGN PATENT DOCUMENTS

| EP | 1 555 479 A1 | 7/2005 |
|---|---|---|
| FR | 2122000 | 8/1972 |
| GB | 917262 | 1/1963 |
| GB | 2 389 729 A | 12/2003 |
| KR | 20050070839 * | 7/2005 |
| WO | WO 2006/091176 A1 | 8/2006 |

* cited by examiner

CABLE-BASED MOUNTING SYSTEM

CROSS REFERENCE TO RELATED PATENT APPLICATIONS

The present application claims priority to U.S. Provisional Patent Application No. 61/043,667, filed Apr. 9, 2008 and incorporated herein by reference in its entirety.

FIELD OF THE INVENTION

The present invention relates generally to mounting systems. More particularly, the present invention relates to mounting systems for use with audio/visual equipment such as flat panel displays.

BACKGROUND OF THE INVENTION

This section is intended to provide a background or context to the invention that is recited in the claim. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Recently, flat panel televisions and other flat panel display screens have become popular among consumers as prices have fallen. One appeal of flat panel displays is the increased ability to mount the flat panel display in various locations where traditional "tube" displays could not be easily located. One such popular location is on a wall. As a result of the increased popularity and the increased affordability, more consumers may purchase flat panel televisions with the desire to mount the flat panel display on a wall.

Traditional tube displays are larger, heavier and bulkier than flat panel displays having similar-sized viewing screens. The size, weight and bulk of the traditional tube displays make placing the display in a variety of locations difficult. In many homes, tube displays are located on entertainment centers or shelving units. These entertainment centers and shelving units provide sufficient support for the tube display and allow the tube display to be located at a generally desirable viewing angle. Some of these entertainment centers and shelving units are large and aesthetically unpleasing. In some homes and many non-residential environments, tube displays are connected to overhead mounting systems. These overhead mounting systems themselves are also often heavy and bulky. As a result, these overhead mounting systems typically require professional installation. Once mounted, the tube displays are difficult to move or adjust due to their location overhead and the need for professional installation.

With flat panel displays, systems have been developed that allow a flat panel display to be mounted to various locations, including a wall. Various mounting systems for flat panel displays provide different features. Many existing displays may comprise several pounds of materials which may be required to be connected to a wall even before the flat panel display is connected. As with some of the mounting systems for tube displays, some of the mounting systems for flat-panel displays are complicated and unfamiliar to install, even requiring professional installation. Also, with the decrease in price of many flat panel displays, the cost of a complex mounting system may comprise a greater percentage of the total cost of purchasing and installing a flat panel display than many consumers may desire.

Mounting a flat panel display may be further complicated by the mounting pattern, or the configuration of the mounting regions on the rear of a flat panel display that allow the display to be connected to a mounting system. Many flat panel displays provide mounting regions on the rear of the display to allow the connection of the display to a mounting system. The connection of a mounting system to the flat panel display is often achieved, at least in part, by using screws which engage with these mounting regions on the rear of the display. The mounting pattern may vary from manufacturer to manufacturer and, even within a manufacturer, between models. As a result of the varied mounting patterns on flat panel displays, not all mounting systems may be used with a given flat panel display.

SUMMARY OF THE INVENTION

Various embodiments of the present invention comprise an improved system for mounting an audio/visual product to a display region such as a wall. The system comprises an attachment mechanism configured to attach to an audio/visual product and a mounting cable operatively connected to the audio/visual product. The mounting cable is configured to attach to the display region. The system according to various embodiments may be inexpensive, involves a reduced amount of material compared to many conventional systems and is easier to install than many conventional systems.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention comprise an improved system for mounting an audio/visual product to a display region such as a wall. The system comprises an attachment mechanism configured to attach to an audio/visual product and a mounting cable operatively connected to the audio/visual product. The mounting cable is configured to attach to the display region. The system according to various embodiments may be inexpensive, involves a reduced amount of material compared to many conventional systems and is easier to install than many conventional systems.

Figure 1:
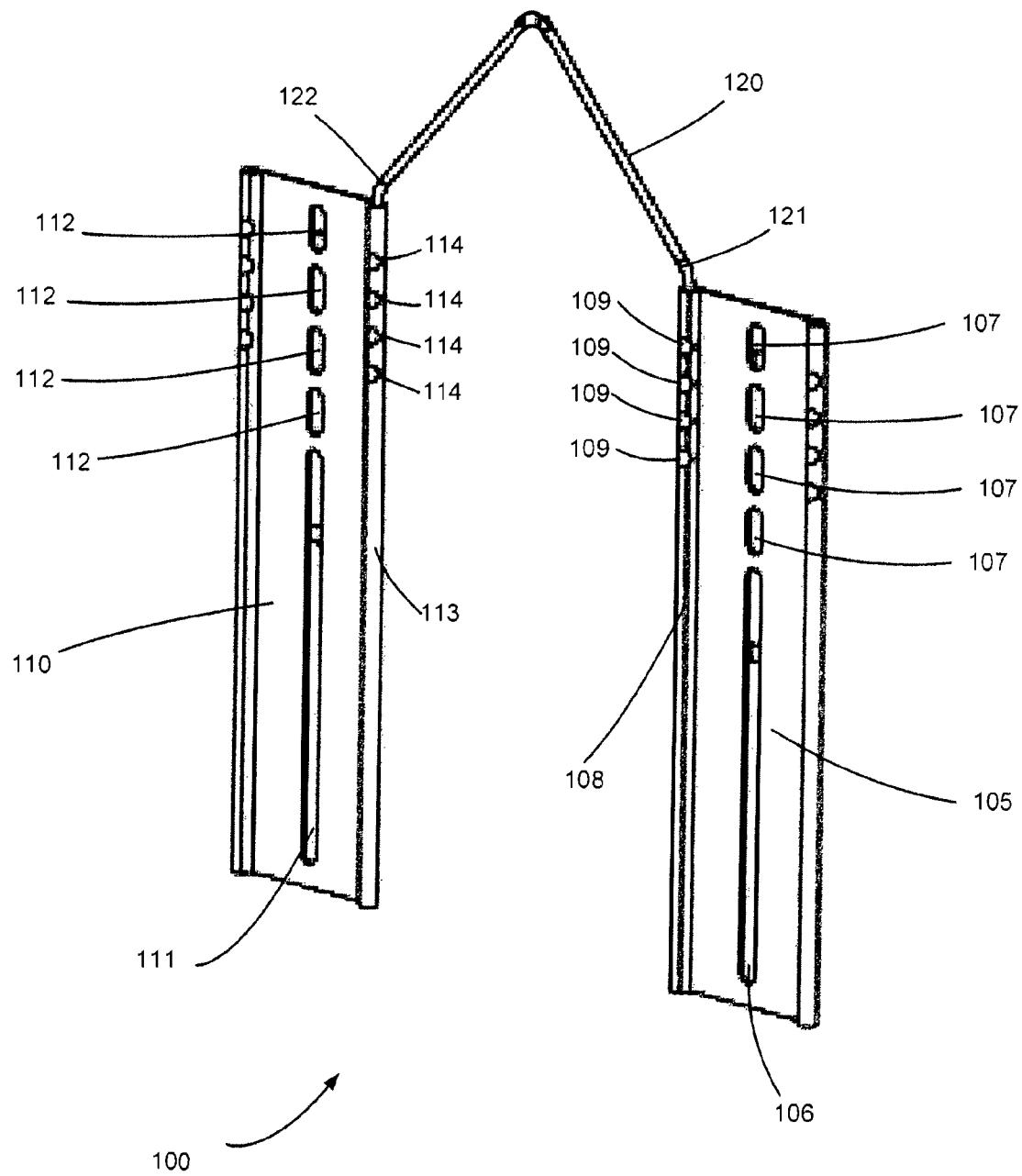
FIG. 1 is a perspective view of a cable-based mounting system constructed according to an embodiment of the present invention.

FIG. 1 is a perspective view of an exemplary cable-based mounting system, shown generally at 100, comprising a first attachment mechanism 105 and a second attachment mechanism 110. The first attachment mechanism 105 includes a first main slot 106 and four first additional slots 107. Similarly, the second attachment mechanism 110 includes a second main slot 111 and a plurality of second additional slots 112. The first main slot 106, the first additional slots 107, the second main slot 111 and the second additional slots 112 are configured to allow the first attachment mechanism 105 and the second attachment mechanism 110 to attach to an audio/visual product (not shown in FIG. 1). The inclusion of the first main slot 106 and the first additional slots 107 allow for the first attachment mechanism 105 to attach to various mounting patterns located on the video product. Similarly, the second main slot 111 and second additional slots 112 allow for the second attachment mechanism 110 to be operatively connected to various video products having various mounting patterns. In other embodiments, the configuration of the first main slot 106, the first additional slots 107, the second main slot 111 and the second additional slots 112 may vary. Additionally, in further embodiments, there may only be a first main slot 106 and a second main slot 111 and no first additional slots 107 or second additional slots 112. The shape and size of the first main slot 106, the first additional slots 107, the second main slot 111 and the second additional slots 112 may vary.

A hanging cable 120 connects at a first end 121 thereof to the first attachment mechanism 105 and at a second end thereof 122 to the second attachment mechanism 110. The first end 121 of the hanging cable 120 is inserted into a first acceptance region 108 of the first attachment mechanism 105. Similarly, the second attachment mechanism 110 includes a second acceptance region 113 to receive the second end 122 of the hanging cable 120. In the embodiment of FIG. 1, the first acceptance region 108 and the second acceptance region 113 each comprise a channel. The hanging cable 120 is operatively secured to the first attachment mechanism 105 using first crimping slots 109. After the hanging cable 120 is inserted into the first acceptance region 108, the first attachment mechanism 105 is crimped at the first crimping slots 109. This securely engages the hanging cable 120 with the first attachment mechanism 105. In a similar fashion, the second end 122 of the hanging cable 120 is attached using second crimping slots 114 in the second attachment mechanism 110.

In other embodiments, the hanging cable 120 may not be operatively connected to the first attachment mechanism 105 and second attachment mechanism 110 by crimping. Instead, the hanging cable 120 may, for example, be operatively connected to the first attachment mechanism 105 by using a hanging cable 120 that comprises a first end 121 of the hanging cable 120 that includes a region that is larger than the diameter of the channel of the first acceptance region 108 to prevent the hanging cable 120 from pulling through the channel of the first acceptance region 108. In further embodiments, the first acceptance region 108 and the second acceptance region 113 may not comprise a channel, but may instead comprise a winding point. The hanging cable 120 may then be operatively connected to the first attachment mechanism 105 by winding the hanging cable 120 around the winding point of the first acceptance region 108. In yet further embodiments, the first acceptance region 108 and the second acceptance region 113 may be configured to allow the hanging cable 120 to be welded to the first attachment mechanism 105 and the second attachment mechanism 110. In still further embodiments, the first acceptance region 108 may comprise a screw configured to engage with the first attachment mechanism 105 to retain the hanging cable 120.

Figure 2:
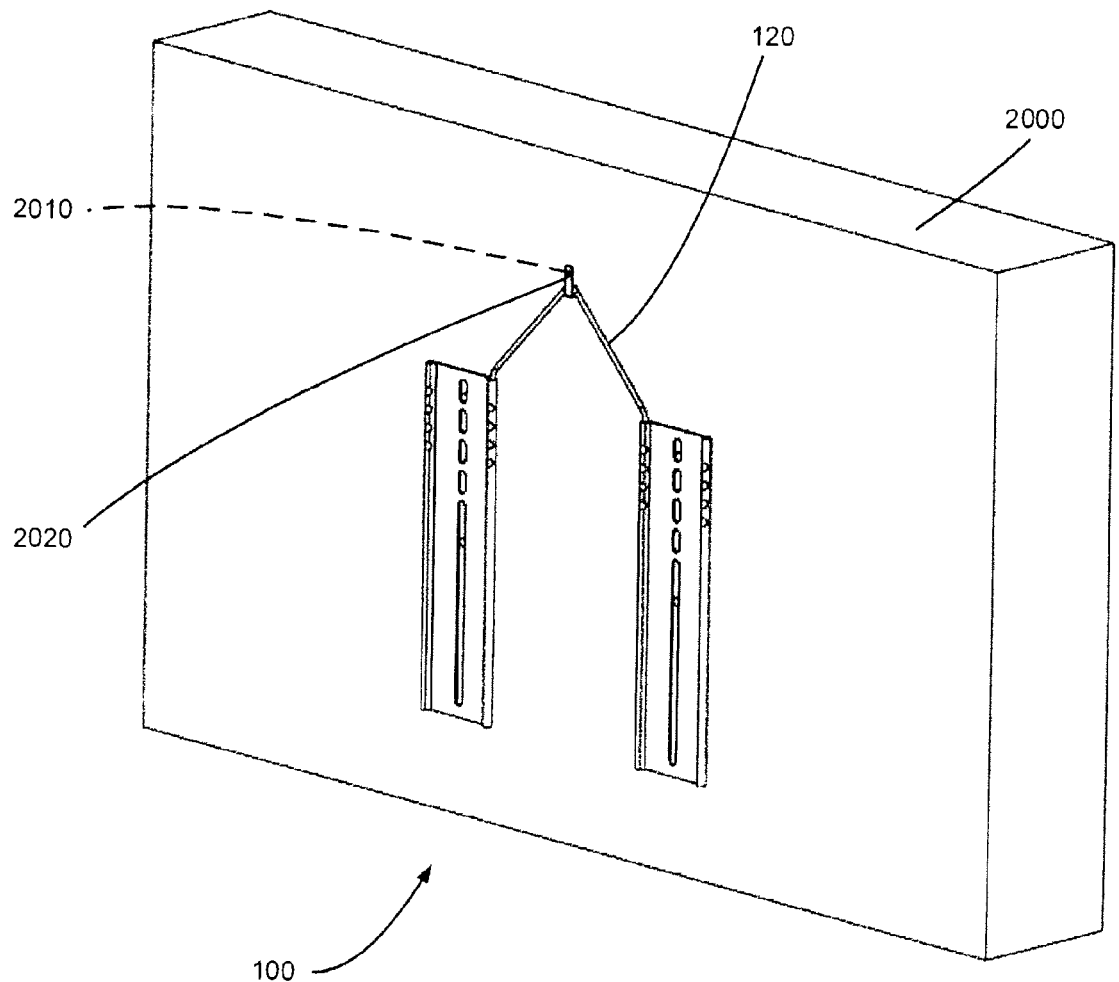
FIG. 2 is a perspective view of a cable-based mounting system constructed according to the embodiment of FIG. 1, shown attached to an audio/visual product.

In the embodiment shown in FIG. 1, the hanging cable 120 is configured in a generally triangular shape between the first attachment mechanism 105 and the second attachment mechanism 110. This allows the hanging cable 120 to engage with a hook as shown in FIG. 2. In other embodiments, the hanging cable 120 may not be substantially rigid, but may instead be substantially flexible and therefore may not form the substantially triangular shape in FIG. 1.

In the embodiment of FIG. 1, the first attachment mechanism 105 and the second attachment mechanism 110 comprise the same piece connected on opposite sides. Using the same piece, but linking the pieces together on opposite sides may allow for reduced costs of production. Additionally, the use of two of the same piece allows may allow for fewer sale returns of the cable-based mounting system 100, as there is decreased risk that any package sent to customers will not contain all of the necessary parts.

FIG. 2 illustrates an audio/visual product, 2000, operatively connected to a display region 2010, using the embodiment of the present invention shown in FIG. 1. In the embodiment of FIG. 2, the display region 2010 is a wall (not shown). In other embodiments, the display region 2010 may not be a wall, instead comprising some other surface. The cable-based mounting system 100 is operatively connected to the audio/visual product 2000 using fasteners such as screws. The cable-based mounting system 100 is also operatively connected to the display region 2010 using a wall anchor 2020 which is operatively connected to the display region 2010. In the embodiment of FIG. 2, the wall anchor 2020 comprises a hook. In other embodiments, the wall anchor 2020 may not comprise a hook, but may instead comprise a nail, a ring, or any other mechanism that can engage the hanging cable 120 to support the audio/visual product 2000.

Once the hanging cable 120 is engaged with the wall anchor 2020, the audio/visual product 2000 may be leveled by moving the audio/visual product 2000 to the left or right to change the fulcrum point on the hanging cable 120 with the wall anchor 2020. This allows for a consumer to easily level the audio/visual product 2000 without reinstalling the cable-based mounting system 100.

Figure 3:
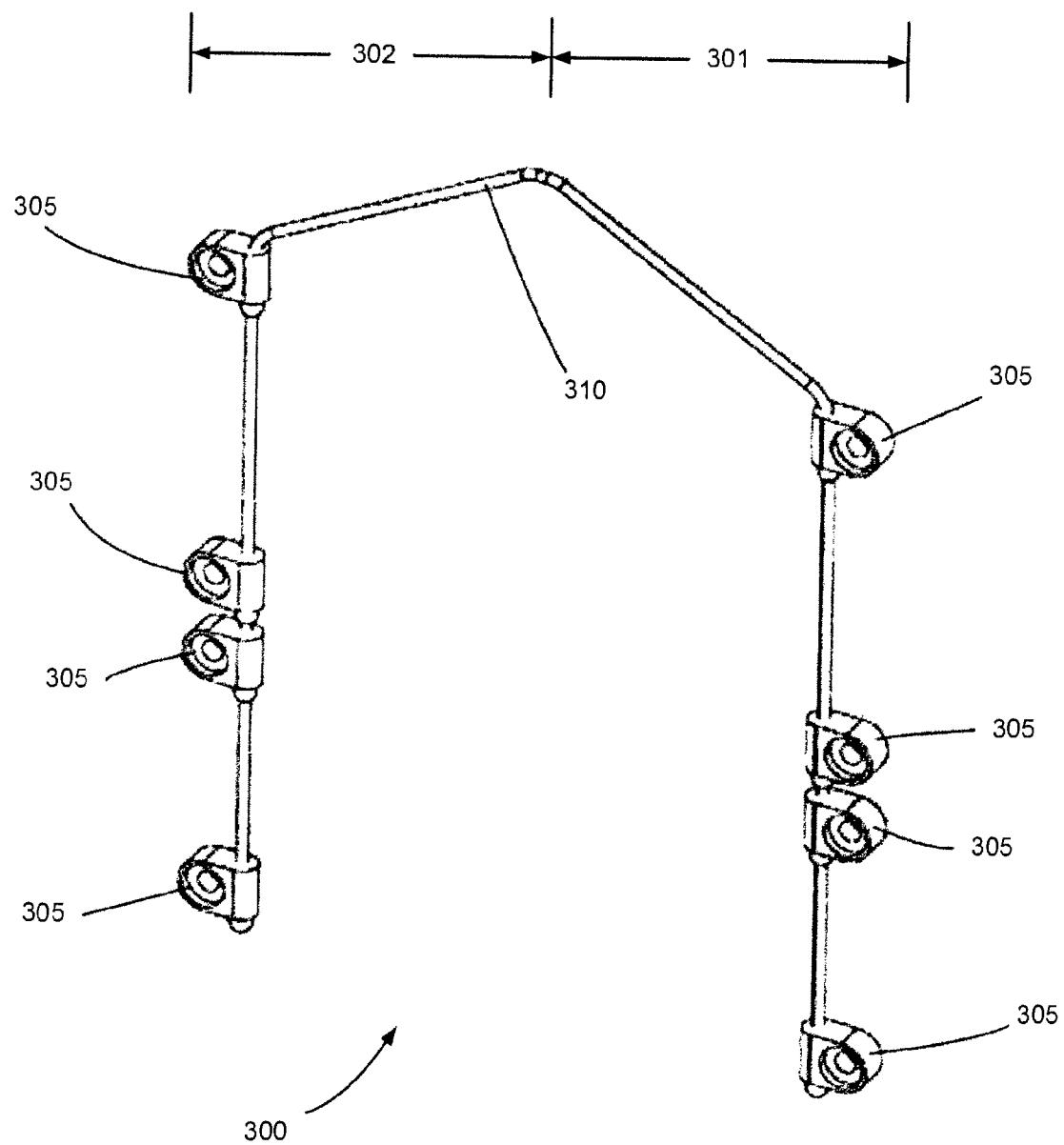
FIG. 3 is a perspective view of a cable-based mounting system constructed according to an additional embodiment of the present invention.

FIG. 3 is a perspective view of a cable-based mounting system, shown generally at 300, constructed according to an alternative embodiment of the present invention. The cable-based mounting system 300 comprises a first side 301 and a second side 302. The first side 301 includes a plurality of attachment mechanisms 305. In the embodiment of FIG. 3, the first side 301 includes four attachment mechanisms 305. The second side 302 similarly comprises a plurality of attachment mechanisms 305. In the embodiment of FIG. 3, the second side 302 also comprises four attachment mechanisms 305. In other embodiments the number of attachment mechanisms 305 need not be four each on the first side 301 and the second side 302 and there need not be the same number of attachment mechanisms 305 on the first side 301 and the second side 302.

In the embodiment of FIG. 3, each of the attachment mechanisms 305 are both slidably and rotatably connected to a hanging cable 310. In other embodiments, the attachment mechanisms 305 may be otherwise movably connected to the hanging cable 310. The ability to slide, rotate, or otherwise move each of the attachment mechanisms 305, allows for a single embodiment of the cable-based mounting system 300 to be attached to a plurality of audio/visual products, each having varying mounting patterns. The embodiment of FIG. 3 is shown with a substantially rigid hanging cable 310. In other embodiments, the hanging cable 310 may be made of a substantially flexible material with sufficient strength to support the audio/visual product, further expanding the variety of mounting patterns with which a single embodiment of the present invention may operate. In similar function to the embodiment of FIGS. 1 and 2, the cable-based mounting system of FIG. 3 operatively connects with a display region using the hanging cable 310.

Figure 4:
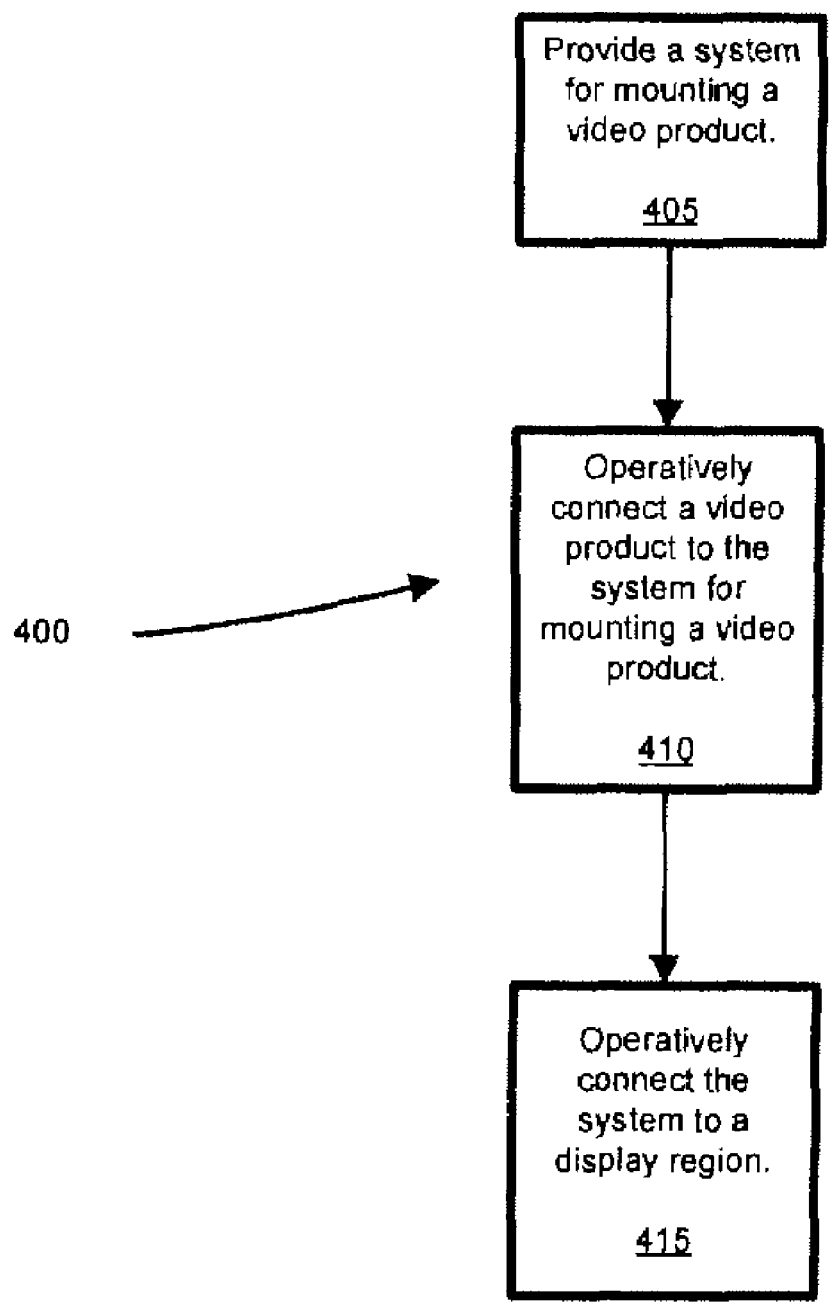
FIG. 4 illustrates an embodiment of a method of mounting an audio/visual product of the present invention.
Figure 5:
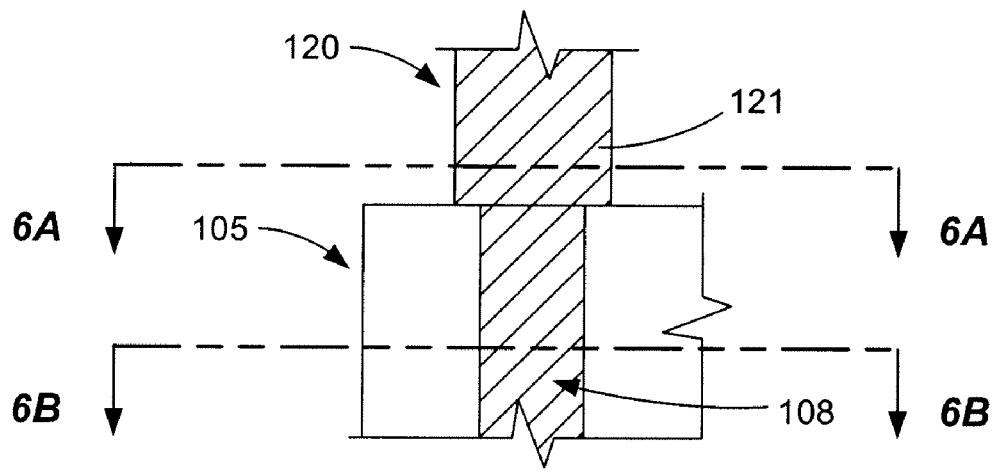
FIG. 5 is a front view of an end of a cable inserted into an acceptance region of an attachment mechanism according to an exemplary embodiment.
Figure 6A:
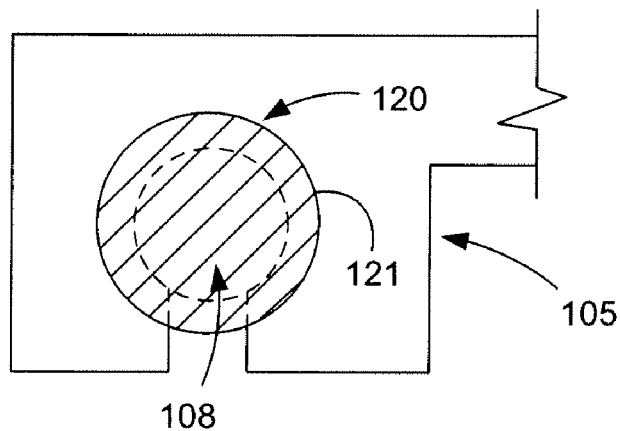
FIG. 6A is a sectional view taken along line 6A-6A of FIG. 5.
Figure 6B:
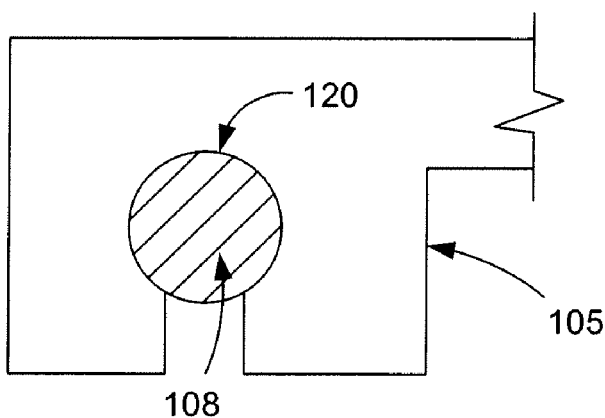
FIG. 6B is a sectional view taken along line 6B-6B of FIG. 5.

FIG. 4 illustrates an exemplary method of mounting an audio/visual product of the present invention, shown generally at 400. At 405 a system for mounting an audio/visual product is provided. At 410, an audio/visual product is operatively connected to the system. At 415, the system is operatively connected to a display region.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A system for mounting a flat panel television to a substantially vertical surface, comprising:
    a hanging cable having a first end and a second end;
    a first attachment mechanism configured to attach to a rear surface of the flat panel television and including a first acceptance region therein, the first acceptance region having a channel receiving the first end of the hanging cable and securing the first end of the hanging cable within the first acceptance region and within first attachment mechanism;
    a second attachment mechanism configured to attach to the rear surface of the flat panel television and including a second acceptance region therein, the second acceptance region having a channel receiving the second end of the hanging cable and securing the second end of the hanging cable within the second acceptance region and within second attachment mechanism; and
    a surface anchor configured to attach to the substantially vertical surface separate from the system;
        wherein the first acceptance region and the second acceptance region each comprise at least one crimping slot configured to operatively secure the respective end of the hanging cable to the respective attachment mechanism, and wherein the hanging cable is configured to attach to the substantially vertical surface via the surface anchor such that, when the system is fully assembled and the flat panel television is mounted to the substantially vertical surface via the system, the hanging cable supports substantially the entire weight of the flat panel television.

2. The system of claim 1, wherein the hanging cable includes a region larger than each of the first and second acceptance regions, the region configured to retain the hanging cable in the respective first and second acceptance regions.

3. The system of claim 1, wherein the hanging cable comprises a substantially flexible cable.

4. The system of claim 1, wherein each of the first and second attachment mechanisms comprises a plurality of slots configured to allow the respective attachment mechanism to attach to the flat panel television.

5. The system of claim 1, wherein the surface anchor is selected from a group consisting of a hook, a nail, and a ring.

6. A system for mounting an audio/visual product, comprising:
    at least one hanging cable;
    at least one attachment mechanism including an acceptance region configured to receive and operatively connect to and secure the at least one hanging cable to the at least one attachment mechanism, the acceptance region having at least one channel and at least one crimping slot configured to receive and operatively connect to and secure the at least one hanging cable to the at least one attachment mechanism; and
    a surface anchor configured to attach to a substantially vertical surface separate from the system;
    wherein the at least one hanging cable is configured to attach to the substantially vertical surface via the surface anchor, and wherein the attachment mechanism is configured to attach to the audio/visual product.

7. A system, comprising:
    a flat panel television;
    a hanging cable having a first end and a second end;
    a first attachment mechanism attached to a rear surface of the flat panel television and including a first acceptance region therein, the first acceptance region having a channel receiving the first end of the hanging cable and securing the first end of the hanging cable within the first acceptance region and within first attachment mechanism;
    a second attachment mechanism attached to the rear surface of the flat panel television and including a second acceptance region therein, the second acceptance region having a channel receiving the second end of the hanging cable and securing the second end of the hanging cable within the second acceptance region and within second attachment mechanism; and
    a surface anchor attached to a substantially vertical surface separate from the system;
        wherein the first acceptance region and the second acceptance region each comprise at least one crimping slot configured to operatively secure the hanging cable to the respective attachment mechanism, and wherein the hanging cable is configured to attach to the substantially vertical surface via the surface anchor such that, when the system is fully assembled, the hanging cable supports substantially the entire weight of the flat panel television.

8. The system of claim 7, wherein the hanging cable includes a region larger than each of the first and second acceptance regions, the region configured to retain the hanging cable in the respective first and second acceptance regions.

9. The system of claim 7, wherein the hanging cable comprises a substantially flexible cable.

10. The system of claim 7, wherein each of the first and second attachment mechanisms comprises a plurality of slots configured to allow the respective attachment mechanism to attach to the flat panel television.

11. The system of claim 7, wherein the surface anchor is selected from a group consisting of a hook, a nail, and a ring.

* * * * *